Oct. 18, 1960 G. NEIDL 2,956,503
ROTARY PUMPS, PARTICULARLY FOR DELIVERY OF SEWAGE, THICK
SLURRIES AND THE LIKE LIQUIDS
Filed Jan. 30, 1957 3 Sheets-Sheet 1

Oct. 18, 1960     G. NEIDL     2,956,503
ROTARY PUMPS, PARTICULARLY FOR DELIVERY OF SEWAGE, THICK
SLURRIES AND THE LIKE LIQUIDS

Filed Jan. 30, 1957     3 Sheets-Sheet 3

United States Patent Office 2,956,503
Patented Oct. 18, 1960

2,956,503

ROTARY PUMPS, PARTICULARLY FOR DELIVERY OF SEWAGE, THICK SLURRIES AND THE LIKE LIQUIDS

Georg Neidl, 108 Schonfiesser Strasse, Berlin-Frohnau, Germany

Filed Jan. 30, 1957, Ser. No. 637,230

Claims priority, application Germany Feb. 15, 1956

3 Claims. (Cl. 103—103)

Centrifugal pumps having special constructions have been used for the delivery of sewage, thick slurries, plastic masses, concrete, mortar, sludge, mud, moor, sand, chemical pastes, and other suspensions. It has been shown, however, that these pumps are easily clogged because the tough or compact masses contained in the delivered goods, such as paper, rags, stones and the like easily get stuck not only in the channels of the centrifugal pump, but jam also in the point of transition between the rotating and stationary portions of the pump.

According to the invention, these disadvantages are avoided by mounting a pump member in inclined relation on a shaft within a stationary cylindrical housing which may also be constructed spirally in accordance with the teachings of centrifugal pump construction having the driven shaft arranged concentrically of the axis of the housing in such manner that this pump member rotates with clearance within the housing during the wabble movements caused by the rotation. The feed socket is provided in the axis of the housing, while one or more pressure sockets are provided at or adjacent the circumference of the housing either at the cylindrical periphery or at one of the end faces of the housing.

Pump members of disc-like configuration have become known already which are mounted in inclined manner on the pump shaft and perform, therefore, wabble movements during the rotation of the shaft. These known pump members, however, are disposed to such an extent tightly in the housing that a displacing effect is exercised on the delivered goods during the rotational movement. These known pumps are suitable only for fluid goods containing no impurities, but are not suitable for liquids containing sewage or solid matters; in working with these, the known pumps would get stuck by clogging and jamming, quite apart from the fact that an uneconomical wear occurs on the sliding surfaces which move closely in the housing of such pumps.

In a further development of the inventive idea, the pump member may be constructed as a simple rod of any cross-section or as a tube which is connected to the pump shaft in inclined relation. The pump member may be formed also as elliptic disc which is mounted, with flying support of the shaft, at the inner end thereof, the axial projection of this disc being of circular shape and the circumference thereof having, advantageously, throughout a uniform spacing of preferably 1–4 and more millimeters from the inner cylinder wall of the housing.

Also, the pump member may be constructed of several single elements which are not only inclined relative to the pump shaft, but are inclined also to one another.

In order to increase the desired tearing and cutting effects at the periphery of the pump member, it is advantageous to design this member cutter-like particularly in the portions lying closest to the housing or to provide it with indents, especially with saw teeth or blades.

In modifying the inventive idea, the pump member may be designed not as tube, but as hollow disc, a pressure fluid being introduced through the hollow shaft into the interior of the pump member, which fluid is discharged through openings in the tube or in the hollow disc. Compressed air, steam, or a gas may be used as pressure fluid, or also a liquid may be introduced into the hollow pump member.

Further details of the invention may be explained on basis of the drawings, which are shown merely by way of example. Therein, Fig. 1 shows diagrammatically an axial cross-section through a pump, wherein a flying pump member in the shape of an elliptical disc is mounted on a shaft;

Figure 1:
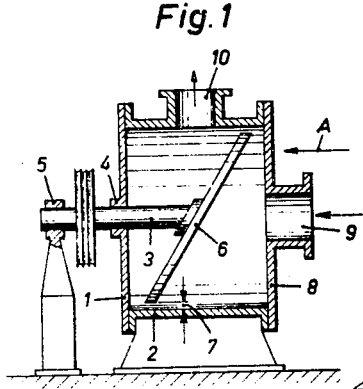
Fig. 1a is a perspective view of the elliptical disc of Fig. 1.
Figure 3:
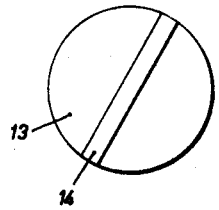
Fig. 3 is a similar view of another embodiment of a pump member which is constructed disc-like and, besides, is provided with reinforcing ribs on either sides.
Figure 1A:
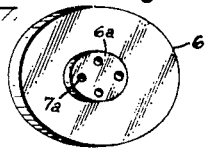

According to the embodiment of Figures 1 and 3, a shaft 3 is flyingly supported in two bearings 4, 5 at a cover 1 of a cylindrical pump housing 2. A disc-like pump member 6 is mounted in inclined relation at the inner end of this shaft 3 and performs wabble-like movements when the shaft 3 rotates. The shape of this pump disc is elliptical such that the circumference in the direction of the axial projection (corresponding to the arrow A) appears circular so that when this disc rotates within the housing 2 the same clearance 7 exists at all points between the circumference of the disc and the inner cylinder circumference of the housing and amounts to about 1–4 millimeters. In Fig. 1a this elliptical disc 6 provided with a flange 6a having threaded holes 7a for securing the shaft 3 thereto is shown in a perspective view. In many cases, it is also possible to make the disc simply round in the direction of the axial projection corresponding to the direction of arrow A; this is combined with the disadvantage, however, that the distance between the circumference of the disc and the housing is not uniform throughout.

On the end face remote from the bearing for the shaft, the housing is closed by a cover 8 which centrally contains the suction socket 9. The pressure socket 10 is provided at the cylinder circumference of the housing.

Figure 2:
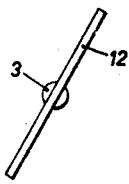
Fig. 2 is a side view of a rod-shaped pump member.

Instead of the disc 6, one or more tube-like or strip-like members 12 are used according to the embodiment of Fig. 2 which are, likewise, welded in inclined relation to the end of the pump shaft 3.

According to the embodiment of Fig. 3, the pump member is constructed as disc 13 which is provided with embossments or recesses 14 on both sides. These embossments or recesses in Fig. 3 are provided preferably on that side of the pump member with respect to Fig. 1 which face the suction socket 9. These embossments or recesses may, in many cases, have the curved shape corresponding to the centrifugal pump constructions, the curves theoretically terminating where the pump member is mounted on the shaft. Also, the members 12 according to Fig. 2 may be similarly curved.

Figure 4:
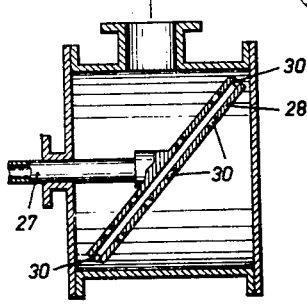
Fig. 4 shows an axial cross-section of a pump housing having a hollow shaft and hollow pump member.

In spite of the simple shape of the pump member, particularly when it is constructed rod-like, tube-like or strip-like, it may happen that impurities, especially fabrics and other textiles, are wound around the rod and are not thrown off by centrifugal force; it may be advisable then, according to the embodiment of Fig. 4, to guide compressed air from a compressor through the hollow shaft 27 of the pump member 28 into the hollow interior of the rod-like pump member, this pump member being provided with a plurality of apertures spaced over the circumference. The hollow pump member 28 may also be provided with apertures 30 at both ends thereof, if it is rod-like, or at the circumference thereof, if it is disc-like so that the compressed air is discharged from the pump member 28 not only laterally but also at its ends and its circumference respectively. Thus compressed air may be introduced into the pump member 28 continuously or if desired, at certain intervals, the air entering the interior of the pump housing through the apertures 30. This compressed air will loosen impurities eventually wrapped about the pump member 28, especially in the form of textiles, paper or the like so that these parts, assisted by the centrifugal force, will be detached in operation from the pump member 28 again, centrifuges and finally discharged through the pressure socket together with the waste water.

Figure 5:
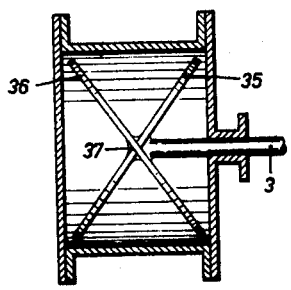
Fig. 5 shows a pump having two disc-like pump elements arranged in inclined relation to one another and to the shaft.

According to the embodiment of Fig. 5, two disc elements 35, 36 disposed inclined relative to each other are mounted on the pump shaft 3 and penetrate each other in the line 37. This line is shown as a point in Fig. 5.

Figure 6:
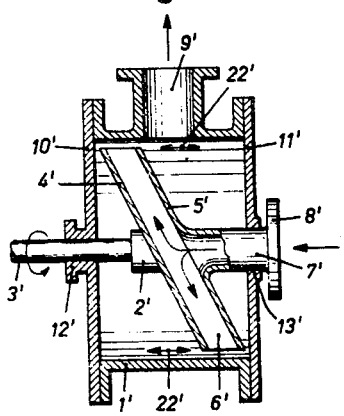
Fig. 6 is a cross-section of a pump having a double disc-like pump member and suction socket on one side.

A pump member 2' is supported flying on a shaft 3' in the interior of the housing 1' according to the embodiment of Fig. 6. The pump member substantially consists of two parallel plane discs 4', 5' mounted in inclined relation on the shaft 3' and leaving free a pump member space 6' therebetween. The disc 5' disposed opposite the flying shaft 3' is enlarged in axial direction to form a suction socket 7' with flange 8'. The flange 8' does not rotate. The housing 1' of the pump member is provided upwardly with a discharge socket 9' and is closed at both end faces by housing covers 10', 11'. The pump shaft 3' and the suction socket 7' respectively are sealed by stuffing boxes 12', 13'. The suction socket 7' extends thus through a stuffing box 13' (not shown) so that the flange 8' may be rigidly secured to the cover 11'.

Figure 7:
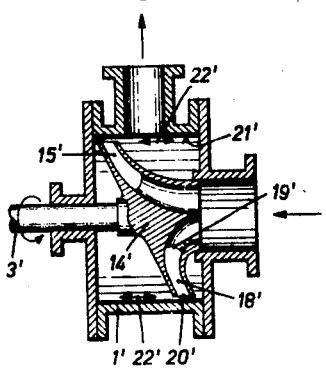
Fig. 7 shows a cross-section through a pump, wherein the pump member has approximately the shape of a usual centrifugal pump rotor which, however, is mounted inclined relative to the shaft.

On the pump shaft 3' according to the embodiment of Fig. 7 there is provided a blade wheel-like pump member 14' containing, similar to the usual centrifugal pumps, blade channels 15', 18' or only one such channel. The inlet edge 19' of the blades may be seen in the interior. The outlet edges 20' or the circumference of the blade wheel are directed in parallel relation to the generating line of the inner cylinder surface 21' of the housing 1'.

If the pump members according to the two embodiments are rotated in accordance with the shown arrow, the circumferential portions of the rotating pump members perform a reciprocating movement with respect to each generating line of the housing according to the shown double arrows 22'. The direction of rotation per se is irrelevant in the embodiment of Fig. 6, whereas it is defined by the contour of the blade channels in the embodiment of Fig. 7.

Figure 8:
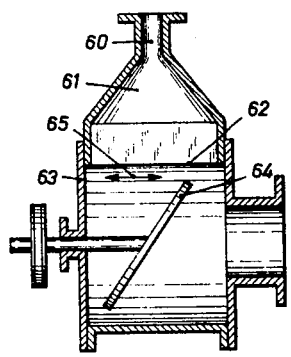
Fig. 8 is a cross-section through a pump housing having slot-like enlargements of the connecting portion of the delivery conduit to the housing.

In the embodiment of Fig. 8, the pressure socket, starting from the pressure line 60, is provided with an enlarged portion 61 which extends slot-like at 62 over the entire width of the housing or a portion thereof and opens into the housing 63 with an accordingly wide slot. It is obtained in this manner that during the rotation of the pump member the respective edge 64 lying on top reciprocates in accordance with the arrow 65 over the entire width of the housing and thus of the slot, so that the pump may operate with much less resistance on account of the enlarged pressure aperture in the housing 63.

Figure 9:
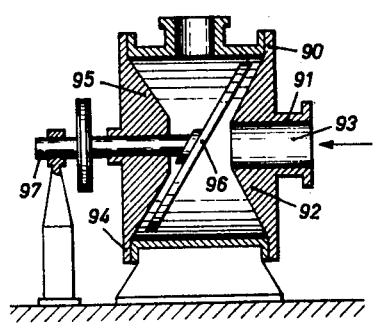
Fig. 9 shows a cross-section of a pump, wherein both covers are provided with profiles.

According to the embodiment of Fig. 9, the cover 90 which is provided with the suction socket 91 is enlarged inwardly to form a cone 92 through which the bore 93 of the suction socket is passed. The cover 94 on the opposite side is, likewise, inwardly extended to form a cone 95 the cone generating line of which corresponds to the inclination of the pump member disc 96 as does also the generating line of the cone 92. It is apparent that the shaft 97 has a particularly long and therefore reliable support within the conical enlargement.

Figure 10:
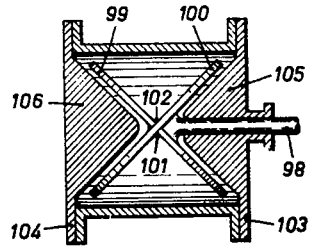
Fig. 10 is another modification similar to that of Fig. 9, wherein the pump member, however, consists of two disc-like elements standing at an angle relative to each other.

According to the embodiment of Fig. 10, two pump member discs 99, 100 which are inclined relative to each other and are provided with arched roundings 101, 102 at the point of intersection are mounted on the shaft 98. Conical profiles 105, 106 the generating lines of which are parallel to the disc surfaces are provided on the two covers 103, 104. This embodiment shows a particularly good adaptation of the conical profiles to the shape of the intersecting two discs so that the efficiency is particularly favourable here.

Figure 11:
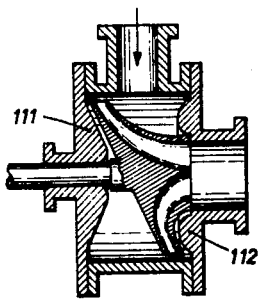
Fig. 11 shows an embodiment similar to that of Fig. 9, wherein, however the pump member is of the shape of a centrifugal pump rotor.

In the embodiment of Fig. 11, the profiles 111 and 112 are adapted to the shape of the centrifugal pump member.

Figure 12:
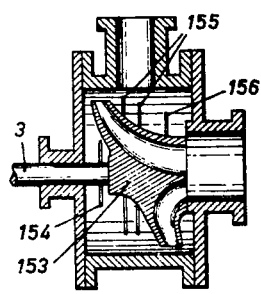
Fig. 12 shows an embodiment of the pump rotor similar to Fig. 7, wherein saw blade-like discs are mounted not only on the shaft, but also on the outer circumference of the pump member.

According to the embodiment of Fig. 12, the shaft 3 is provided, apart from the main pump member 153, also with a special saw blade or a cutter rim 154 because textiles wrap around the shaft very easily especially at this point. Furthermore, the pump member 153 itself may be provided at the outside with saw blades 155, 156, these saw blades being disposed either vertically or in inclined relation relative to the shaft or one another. While the saw blades 155 surround the pump member in a closed circle, the saw blade 156 surrounds the rotor member only partly.

Figure 13:
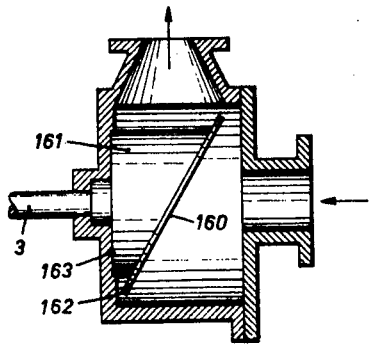
Fig. 13 shows a pump member having an inclined disc and a cylindrically enlarged intermediate portion between the disc and the shaft.

According to the embodiment of Fig. 13 an intermediate structure 161 is interposed between the flying pump shaft 3 and the disc-like pump member 160, structure 161 being of the shape of a cylinder slopingly cut off at one end face, the end face of the intermediate structure facing the shaft cover 162 is inserted with a clearance in a corresponding recess 163 of this cover 162, whereby it is intended to prevent that textiles wrapped arround may get stuck. To prevent these textiles from accumulating on the intermediate structure, the surface thereof may be provided throughout with saw teeth or cutters which serve to tear and comminute any solids.

As the slopingly cut cylinder does not have any full circumferential circles, looking vertically to the pump shaft, it is apparent that textile fibers or the like cannot be wrapped around it.

It is not absolutely necessary, thereof, to provide saw teeth or the like on this slopingly cut cylinder, but it may be smooth on its circumference.

The disc-like constructed pump member, furthermore, so to speak, covers the slopingly served cylinder at its end circumference facing the interior of the pump. If now the disc-like shaped pump member is provided, moreover, with saw teeth or dents or its total circumference is constructed as cutter, then the slopingly cut cylinder is further protected from being wrapped.

The apparatus of the invention may be used also for comminuting and simultaneously conveying materials which are pasty per se, such as concrete or the like, or for lump goods such as fruit, beets, shells, fish and the like. For such material, however, in deviation from the main invention, the apparatus must not be arranged horizontally, but must be disposed vertically and a feed hopper must be provided at the inlet socket. Fruit such as used in fruit-press plants for producing fruit juice, beets as used in sugar works, fish as used in fish meal factories and shells used in plants for producing lime powder are simply fed into the hopper and accordingly comminuted by the inventive pump and discharged through the pressure line together with the separating liquid. The invention has the advantage over prior systems that it is a combination of a comminuting apparatus and a conveying device and, thus, is simple and inexpensive.

Figure 14:
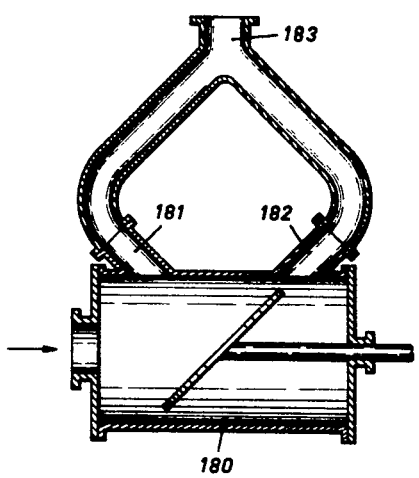
Fig. 14 shows a cross-section through a pump housing having two pressure sockets disposed V-like in inclined relation to each other.

In a further development of the invention, it may be advantageous to provide not only one pressure socket, but two pressure sockets 181, 182 (Fig. 14) and to connect these in V-shape obliquely to each other and obliquely to the housing and pump axes with the housing 180 because it was found that alternate thrust movements are caused in the direction of these inclined sockets by the pump member due to the wabble movements of the rotating pump member, whereby conveying is facilitated. The pump member, so to speak, alternately pushes the delivered goods in the direction of the inclined sockets into these.

To eliminate the disadvantage of wrapping tough textiles, such as perlon or nylon, for a disc-like pump member (Figs. 15, 16) which is disposed in the interior of the pump housing at the end of a flying shaft, a cone structure (178) is mounted on the shaft side cover with cone generating lines lying respectively in parallel to the direction of the pump member disc (175). The disc-like pump member defines, with respect to a radius, in rotation a conical surface. Between the radius of the pump member disc and the cone, there is thus created a rotating linear very narrow space on a radius line. The radius of the pump member disc must be imagined to lie in the inclined plane of this pump member disc. A plurality of teeth 177, dents, cutters, spikes or blades are provided on the surface of the rotor disc facing the cone on the aforementioned radius line of this pump member disc. Similar dents 189, spikes, cutters, or blades are provided also on the cone structure.

Figure 15:
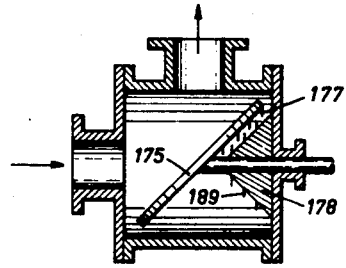
Fig. 15 is a cross-section through a pump having a conical internal cover attachment and tearing teeth on the disc-like pump member.
Figure 16:
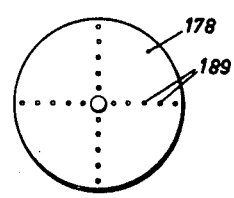
Fig. 16 is a view of the conical attachment of the cover of the housing of the pump according to Fig. 15.

The distribution of the indents may be arranged in different manner both on the rotor and the cone structure, e.g. in radially extending rows which may extend also cross-like on the cone structure (Fig. 16). The teeth, dents and the like preojections are advantageously provided in such manner on the two structures that the respective teeth and dents of one of the structures engage between the gaps of the teeth of the other structure. Since the mentioned radii are respectively parallel to one line of the conical structure when the disc-like rotor rotates and these opposite parallel positions rotate in the housing at the speed of the rotor, eventually sticking textiles are securely torn into fine rags by the engaging dents and centrifuged from the rotor so that the pump cannot be clogged any more by being wrapped. The front side of the disc 175 in Fig. 15 is not endangered in this respect because it is free toward the suction socket.

The inventive apparatus is also adapted to knead or pull materials having a pasty or loamy consistency. The inventive apparatus finally, may also be used for conveying granular bulk goods such as wheat or rye grains or granular goods used by the chemical industry or also straw-like goods such as sugar cane.

The disc of the pump member mounted obliquely on the shaft may also be provided with conical, arched, hyperboloid, paraboloid or similar attachments on one or both sides.

Under certain circumstances, it is advantageous to provide holes or apertures in the rotor, particularly if it is constructed as a disc. Especially when dealing with viscous goods to be conveyed such as concrete, a thrust compensation is thus obtained, a portion of these goods passing through the holes during the wabble movements of the disc. This improves the efficiency of the pump. These holes are of particular importance when the disc is of elliptical shape and the clearance at the circumference of the disc opposite the housing is comparatively small so that the loss of energy by thrust is comparatively great in this case. However, these holes may be of importance also with circular discs which do not rotate as closely as that to the housing.

The last described embodiment with holes, however, cannot be used offhand when fibrous goods, rags, flaps or the like suspended in the waste water are to be conveyed because these components may easily stick at the holes of the pump member. To provide, nevertheless, a compensation, it may be advantageous to interconnect in accordance with Fig. 17 the front and rear cylinder covers by two closed pipe lines 190, 191. It is obtained hereby that an oscillating or swinging movement of the liquid is created in the two pipe lines in accordance with the shown double arrow 192. This double arrow 192 characterizes the movement of the individual portions of the disc-like non-perforated pump member. This construction of the pump disc shows the advantage that components of fibrous or textile nature cannot get stuck on the disc. It may be advantageous to provide one air dome 193, 194 each in the two pipe lines 190 and 191 in order to dampen the shocks occurring in consequence of the oscillation.

Figure 17:
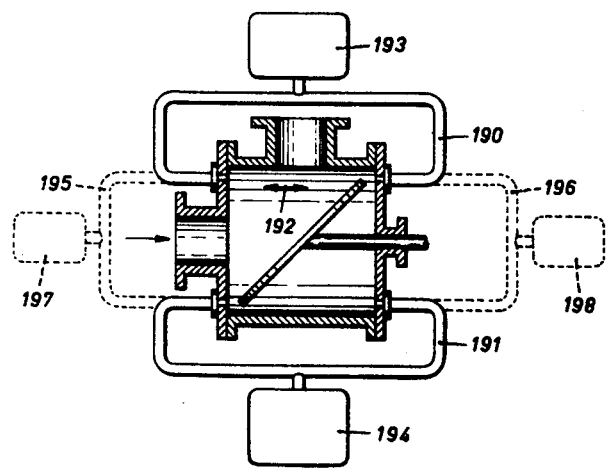
Fig. 17 shows a pump with bypass conduits for the front and rear cylinder covers.

According to another embodiment shown in Fig. 17 in dotted lines, a bypass line 195, 196 is arranged at each cover, these bypass lines connecting the respective upper partial spaces of the housing with the lower partial spaces, whereby the quantity of liquid which, for example, is displaced by the pump member upwardly to the left may escape through the bypass line 195 downwardly and, on the other side, the quantity of liquid which is displaced in the lower portion to the right may escape upwardly through the bypass line 196. Also these lines 195, 196 may be provided with air domes 197, 198 to intercept the shocks.

It is also possible, finally, to combine the two pairs of bypasses 190, 191 and 195, 196, i.e. to provide both the bypasses shown in full and in dotted lines.

Also, it is possible to provide in combination holes in the disc and bypass lines as just described on the housing.

While the invention has been illustrated and described in the aforesaid embodiments, it is not intended to be limited to the details shown, since various modifications and structural changes may be made without departing in any way from the spirit of the present invention.

What I claim as my invention and desire to secure by Letters Patent of the United States is:

1. A rotary pump, in particular for conveying sewage, thick slurries and similar liquids containing compact masses such as paper, rags, stones and the like, comprising a stationary cylindrical housing provided with one end wall having a central axial inlet, said housing having another end wall opposite to said one end wall and inlet, a radial outlet in the cylindrical wall, a shaft having one end extending axially of said other end wall into said cylindrical housing, a flat impeller disc having an elliptical outer periphery, mounted on said end of the shaft at an angle to the axis thereof, the outer peripheral edge of the disc defining a cylindrical surface substantially parallel to the cylindrical inner surface of the housing on the rotation thereof, said disc presenting an inclined surface that upon rotation thereof produces an axial movement in the fluid through the central axial opening in the cylindrical housing and impels the fluid by centrifugal action outwardly through said radial outlet, whereby thick slurries and similar liquids are propelled by the inclined disc.

2. Rotary pump according to claim 1, wherein said radial outlet in the cylindrical wall extends slot-like over the entire width of said housing.

3. Rotary pump according to claim 1, wherein both said end walls are of frusto-conical shape extending inwardly of said housing.

References Cited in the file of this patent

UNITED STATES PATENTS

| | | |
|---|---|---|
| 2,107,090 | Swennes | Feb. 1, 1938 |
| 2,515,538 | Wall | July 18, 1950 |
| 2,610,836 | Clarke | Sept. 16, 1952 |
| 2,697,589 | Davey | Dec. 21, 1954 |
| 2,773,453 | Gemeinhardt | Dec. 11, 1956 |

FOREIGN PATENTS

| | | |
|---|---|---|
| 183,980 | Austria | Dec. 10, 1955 |
| 240,004 | Germany | Oct. 25, 1911 |
| 556,762 | France | Apr. 19, 1923 |
| 751,591 | Great Britain | June 27, 1956 |
| 932,556 | Germany | Sept. 5, 1955 |